United States Patent [19]

Boughton

[11] Patent Number: 4,589,671
[45] Date of Patent: May 20, 1986

[54] LOAD CARRYING ROAD VEHICLES
[75] Inventor: Thomas T. Boughton, Amersham, England
[73] Assignee: T. T. Boughton & Sons Ltd, Great Britain
[21] Appl. No.: 678,716
[22] Filed: Dec. 6, 1984
[30] Foreign Application Priority Data Dec. 7, 1983 [GB] United Kingdom ............... 8332584

[51] Int. Cl.[4] ............................................. B62D 53/08
[52] U.S. Cl. .................................... 280/433; 414/546
[58] Field of Search .......... 280/425 R, 425 A, 415 R, 280/415 A, 415 B, 433, 423 R; 414/546, 547, 549

[56] References Cited

U.S. PATENT DOCUMENTS

| | | | |
|---|---|---|---|
| 3,163,306 | 12/1964 | Bennett et al. | 280/415 B |
| 3,355,043 | 11/1967 | Talbert | 280/425 R |
| 3,718,346 | 2/1973 | Self et al. | 280/415 B |
| 3,819,075 | 6/1974 | Derain | 414/549 X |
| 3,894,749 | 7/1975 | Kozuh | 280/423 R |
| 3,941,407 | 3/1976 | Breford | 280/415 A |
| 4,088,339 | 5/1978 | Sagebiel | 280/423 R |
| 4,453,878 | 1/1984 | Paukku | 414/546 X |

FOREIGN PATENT DOCUMENTS

| | | | |
|---|---|---|---|
| 650059 | 12/1962 | Italy | 280/415 B |
| 1563399 | 3/1980 | United Kingdom . | |
| 2112358A | 7/1983 | United Kingdom . | |

*Primary Examiner*—John A. Pekar
*Attorney, Agent, or Firm*—Lucas & Just

[57] ABSTRACT

A vehicle is provided with hydraulic mechanism (1,2,3,4) capable of loading a transport frame (6) having at the front end thereof an upstanding member (5) for cooperation with the hydraulic mechanism (1,2,3,4). The transport frame (6) is provided with anchor members (10) which cooperate with hooks (26) and latches (30) to lock the transport frame (6) directly to the main chassis members (7) of the vehicle. The transport frame is also provided at the rear end thereof with a platform (51) which supports a fifth-wheel coupling (55,56,57,58). The platform also supports two ramps (62 and 63) used in loading the frame onto the vehicle. When the transport frame (6) is loaded on to, and locked to, the vehicle, the vehicle can be used to pull a trailer having a dependent king pin capable of being secured in the fifth-wheel coupling.

9 Claims, 9 Drawing Figures

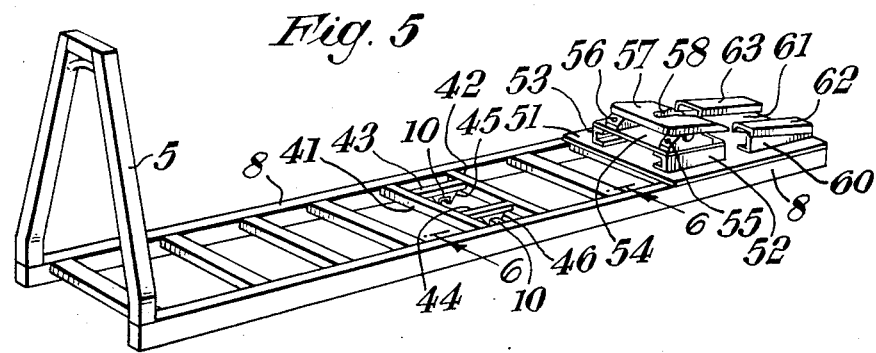
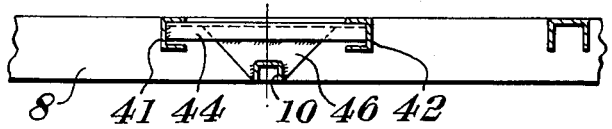
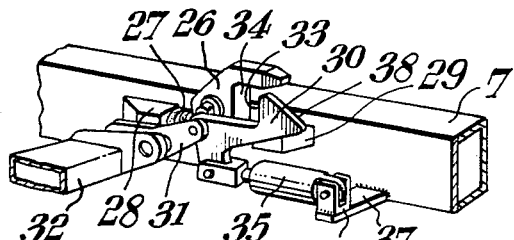
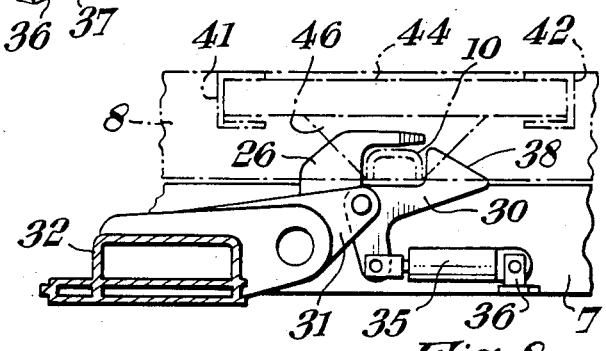
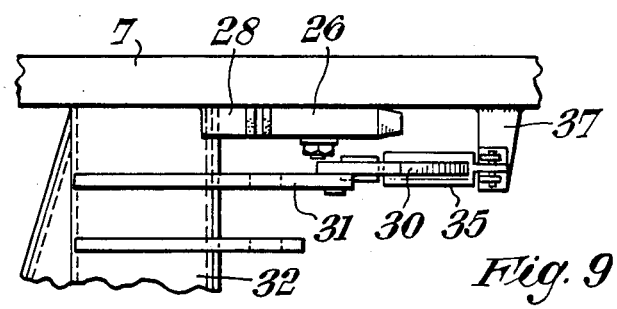

LOAD CARRYING ROAD VEHICLES

This invention relates to load carrying road vehicles of the kind provided with a transport frame and means for hoisting the frame on to the vehicle and off-loading it from the vehicle.

Various systems are known for hoisting transport frames on to vehicles, and one such known system is illustrated in FIG. 1 of Patent Application No. 82 36344 Great Britain (Publication No. 2 112 358). This particular system includes a lifting arm pivotally mounted on the vehicle and carrying at its free end a hook adapted to engage an upstanding member at the forward end of the transport frame.

Another system has been proposed in which the upstanding member at the forward end of the transport frame is omitted. In this case the lifting arm includes a telescopic member which carries the hook at its free end. With this arrangement the telescopic member can be extended to enable the hook to engage the forward end of the transport frame, even though it is located at ground level.

It is to be understood that the invention is particularly concerned with load carrying road vehicles of the general kinds referred to in the two preceding paragraphs, but it is also applicable to other types of vehicle in which the transport frame is lifted on the the vehicle by means other than those previously referred to.

It is an object of the present invention to increase the versatility of a load carrying vehicle of the kind referred to. In particular it is an object of the invention to enable the vehicle to be converted from a load carrying vehicle into a tractor.

From one aspect the invention consists in a vehicle comprising a transport frame, means for moving said frame on and off said vehicle over the rear end of said vehicle, means for locking said frame in position on to said vehicle, and coupling means mounted adjacent to the rear end of said frame for coupling a trailer to said vehicle.

Various means are known for coupling trailers to vehicles, and it is to be understood that the particular coupling means mounted on the transport frame will be designed to co-operate with the complementary coupling on the trailer with which the vehicle is to be used. In particular, for example, the coupling means on the frame could be in the form of a ball carried on the upper end of a stem, fixed to the transport frame, said ball being adapted to be inserted in a socket located at the forward end of the trailer. However, it is preferred that the coupling should be of the kind normally referred to as a fifth wheel coupling. Such a coupling comprises jaws mounted on the transport frame and adapted to receive a king pin which is dependent from a structural member at the forward end of the trailer. These jaws lock automatically when the king pin is inserted into them and can only be released by means of a manually-operated lever. In this case the combination of the vehicle and trailer will be similar to the well-known articulated vehicles, in which the fifth wheel coupling is secured directly to the tractor chassis.

It is to be understood that, when the vehicle is to be used as a load carrying vehicle, the load will normally be secured to the transport frame, while the latter is located at ground level. The vehicle will be reversed towards the forward end of the transport frame and the frame will then be lifted by the hoisting means on the vehicle over the rear end of the vehicle. Once the frame has been lifted on to the vehicle, it will be locked to the vehicle so that the load can be transported safely.

When the vehicle is to be used as a tractor, a special frame will be used in place of the normal load carrying frame. This special frame will be provided with the coupling means already referred to.

In order to connect the trailer to the vehicle, the vehicle will be reversed towards the forward end of the trailer until the couplings on the vehicle and the trailer interengage. To assist in producing interengagement of the two coupling parts it is preferred that the guide means should be provided on the transport frame to guide the king pin into the jaws of the fifth wheel coupling. Also, in the case in which the king pin is dependent from a structural member of the trailer, it may be desirable to provide ramps on the rear of the transport frame to support the weight of the trailer while the king pin is being guided into the jaws of the fifth wheel coupling.

From another aspect the invention consists in a transport frame capable of being hoisted on to, and removed from, a vehicle, said transport frame having coupling means mounted adjacent to the rear end thereof for coupling a trailer to said vehicle.

One embodiment of the invention will now be described with reference to the accompanying diagrammatic drawings in which:

FIG. 5 is a perspective view of a transport frame in accordance with the invention;

FIG. 6 is a scrap section on the line 6—6 shown in FIG. 5 looking in the direction of the arrows;

FIG. 7 is a perspective view of one of the hooks for retaining the transport frame in position on the vehicle;

FIG. 8 is a side view of the hook shown in FIG. 7, indicating the inter-engagement of the hook and part of the transport frame, and FIG. 9 is a plan view of the hook illustrated in FIGS. 7 and 8.

Figure 1:
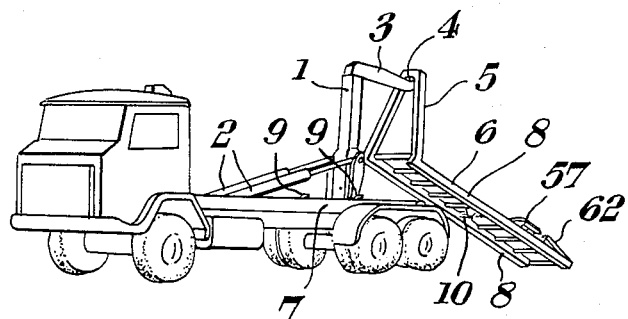
FIG. 1 is a perspective view of a vehicle in accordance with the invention, with a transport frame being loaded on to the vehicle.

The vehicle illustrated in FIG. 1 includes a lifting arm 1 pivotally mounted on the vehicle and controlled by a pair of hydraulic cylinders 2. The lifting arm includes a forward member which is telescopically slideable therein under the control of a further hydraulic cylinder within the lifting arm. The forward member includes a jib 3, the free end of which is provided with a hook 4 designed to engage a bar located near the top of an upstanding member 5 forming part of a transport frame 6. The vehicle includes main longitudinal chassis members 7, and the frame 6 includes main longitudinal members 8. rollers 11 are provided at the rear end of the chassis to engage the two longitudinal members 8.

Figure 2:
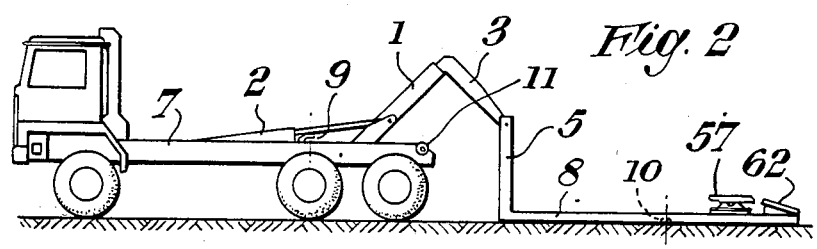
FIG. 2 is a side view of a vehicle in accordance with the invention, with the transport frame on the ground behind the vehicle.
Figure 3:
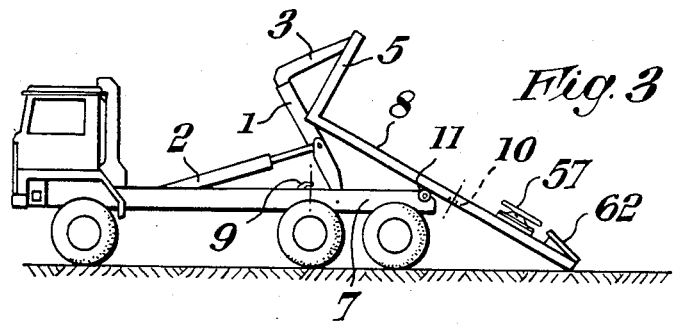
FIG. 3 is a side view of the vehicle illustrated in FIG. 2, with the frame partially loaded on the vehicle.

When the frame 6 is to be loaded on the vehicle, the vehicle is reversed into the position shown in FIG. 2 so that the rear of the vehicle is close to the upstanding member 5 of the frame. The hydraulic control system is operated to rotate the lifting arm 1 to enable the hook 4 to engage the arm on the upstanding member 5. Under these conditions, the jib 3 is in its innermost position as illustrated in FIGS. 1, 2 and 3. The hydraulic control system is then used to rotate the lifting arm 1 anticlockwise as seen in FIGS. 1, 2 and 3 so that the transport frame 6 is drawn over the rear of the vehicle and moves forwardly on the rollers 11 as shown in FIG. 3. When the lifting arm 1 reaches the horizontal position, the jib 3 is extended from the lifting arm by the the further hydraulic control cylinder so that the frame is moved into its transport position shown in FIG. 4 with the upstanding member 5 located close to the rear of the vehicle cab.

In accordance with the invention, locking means are provided to lock the frame 6 to the main longitudinal chassis members 7, and coupling means are mounted adjacent to the rear end of the frame to enable a trailer to be coupled to the vehicle. Various means are known for coupling trailers to vehicles, but the particular coupling means illustrated are of the kind normally referred to as a fifth wheel coupling. Such coupling means are known in themselves and will therefore not be described in detail.

Referring particularly to FIG. 5, it will be seen that a platform 51 is welded to the main longitudinal frame members 8. Welded to the forward part of the platform are two longitudinal support members 52 and 53, and a plate 54 is welded to the upper sides of these support members. The trunnions 55 and 56 of a fifth wheel coupling are carried by the plate 54. As is known, the fifth wheel coupling includes a main plate 57 pivotally mounted on the trunnions 55 and 56, and having a divergent opening 58 at the rear which leads to a pair of jaws not visible in the drawings. These jaws are adapted to receive a king pin which is dependent from a structural member at the forward end of a trailer and lock automatically when the king pin is inserted into them.

Mounted at the rear of the platform 51 are two further support members 60 and 61. These support members carry two ramps 62 and 63 which serve to raise the forward end of the trailer to assist in entry of the king pin into the jaws of the fifth wheel coupling.

As can be seen from FIGS. 5 and 6, two anchor members 10 are provided at the approximate center of the fore-and-aft length of the transport frame 6. The frame 6 includes two transverse members 41 and 42, and two longitudinal members 43 and 44 are welded between these two transverse members. Plates 45 and 46 depend from the longitudinal members 43 and 44 and the actual anchor members 10 are welded between the respective plates 45 and 46 and the adjacent main longitudinal members 8. The anchor members 10 cooperate with hooks which are illustrated in FIGS. 7, 8 and 9.

The hook 26 is pivotally mounted on one of the longitudinal chassis members 7. Rotation of the hook in a clockwise direction, as seen in FIGS. 7 and 8, is limited by rubber blocks 27 provided between the front face of the lower part of the hook 26 and a stop member 28 welded to the side of the chassis member 7. Anticlockwise movement of the hook is limited by similar rubber blocks (not visible in FIG. 7) located between the rear face of the lower part of the hook and a further stop 29 welded to the side of the chassis member 7. The hook 26 cooperates with the respective one of the anchor members 10 to prevent forward and upward movement of the frame relative to the chassis members.

To prevent rearward motion of the transport frame relative to the vehicle, a pivotally-mounted latch 30 is provided in association with each of the longitudinal members 7. Each of the latched 30 is pivotally mounted on a support arm 31 which is secured to one of the transverse members 32 of the vehicle chassis. The latch 30 has a substantially vertical locking surface 33 located, when the latch is in the locked position (as indicated in the drawings), substantially in the plane of the open end of the respective hook 26. When the latch is in this condition, the respective anchor member 10 is trapped between the vertical face 33 and the vertical face 34 of the hook 26.

The latch 30 is moved into the locking position as shown by a spring located in a pneumatic cylinder 35. The pneumatic cylinder is pivotally mounted in a trunnion 36 secured to a support 37, itself secured to the longitudinal member 7. The pneumatic cylinder includes a piston which is pulled into the cylinder by means of the spring so that the latch is urged in an anticlockwise direction about its pivot axis, as seen in FIGS. 7 and 8. Each latch 30 is provided with an inclined rearward face 38 so that, when the transport frame 6 is being moved forwardly on the chassis member 7, the anchors 10 will rotate the respective latches in a clockwise direction as seen in FIGS. 7 and 8 against the action of the springs. This clockwise rotation will enable the anchor members to pass over the latches and, when the anchor members are completely within the hooks, the latches will be returned to the locking positions by their respective springs. When the transport frame is to be off-loaded from the vehicle, air is introduced into the cylinders 35 to rotate the latches in a clockwise direction against the action of the springs. This will then enable the transport frame 6 to be moved rearwardly by the hydraulic system without interference from the latches.

Figure 4:
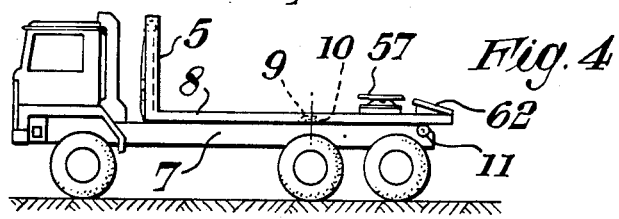
FIG. 4 is a side view of the vehicle illustrated in FIGS. 2 and 3, with the transpoort frame in the transport position.

It is to be understood that, when the vehicle is to be used with a trailer, the special transport frame, as hereinbefore described and illustrated, will be lifted on the the vehicle and locked into the position shown in FIG. 4 by means of cooperation between the anchor members 10 and the hooks 26 and the latches 30. The vehicle will then be reversed towards the trailer until the forward end of the trailer is engaged by the ramps 62. The forward end of the trailer will be provided with a dependent king pin which will pass between the two ramps 62 and 63 and will enter the divergent opening 58 in the fifth wheel coupling. The king pin will be guided into the jaws of the fifth wheel coupling until it is locked therein. Thereafter the vehicle can be driven forwardly or manoeuvred in the normal way with the trailer securely attached thereto. The arrangement described enables a single vehicle to be used both for carrying loads on normal transport frames and for pulling a trailer with the help of the special transport frame herein described.

Although the chassis of the vehicle is not shown in detail, it can be seen from FIGS. 1 to 4 that the lifting arm 1 and the cylinders 2 are pivotally mounted direct on the main chassis members 7. It will therefore be understood that the transverse members between the longitudinal members 7 are suitably shaped to enable the lifting arm 1 and the cylinders 2 to be accommodated between the longitudinal members 7 when the lifting arm 1 has been rotated anticlockwise into the position shown in FIG. 4 in which the lifting arm 1 is horizontal.

I claim:

1. A load-carrying road vehicle comprising: a transport frame; rollers at or near the rear of the vehicle; a hydraulically controlled lifting arm pivotally mounted on the vehicle; and a jib at the forward end of a hydraulically controlled member movable with respect to said lifting arm, said jib being provided with a hook adapted to cooperate with an upstanding member at the forward end of the transport frame, and the jib, the hydraulically controlled member and the lifting arm being arranged to move the transport frame on said rollers, wherein a plurality of anchor members are provided on the transport frame, wherein locking means are provided on the vehicle chassis to cooperate with said anchor members to positively restrict movement of the frame rearwardly with respect to the vehicle chassis, and wherein coupling means are mounted on said frame adjacent to the rear end thereof for coupling a trailer to said vehicle.

2. A vehicle as claimed in claim 1, wherein said coupling means comprise jaws mounted on the transport frame and adapted to receive a king pin which is dependent from a structural member at the forward end of the trailer, said jaws being adapted to lock automatically when the king pin is inserted into them.

3. A vehicle as claimed in claim 2, wherein a platform is provided at the rear end of the transport frame, wherein a plate is fitted on support members secured to the platform and wherein the jaws from part of coupling means mounted in trunnions secured to said plate.

4. A vehicle as claimed in claim 3, wherein two further support members are mounted at the rear of the platform, said support members carrying respective ramps which serve to raise the forward end of the trailer to assist in entry of the king pin into said jaws.

5. A vehicle as claimed in claim 1, wherein said locking means comprise a plurality of hooks and latches on the chassis of the vehicle.

6. A vehicle as claimed in claim 5, wherein each of said latches is pivotally mounted and urged by a spring into a position for locking the respective anchor member within the respective hook.

7. A vehicle as claimed in claim 6, wherein each latch is controlled by a pneumatic cylinder so that it can be opened to allow the transport frame to be removed from the vehicle.

8. A vehicle as claimed in claim 7, wherein each of said latches is provided with an inclined rearward face adapted to rotate the latch against the action of the respective spring when contacted by the respective anchor member during loading of the transport frame on to the vehicle.

9. A transport frame capable of being hoisted on to, and removed from, a road vehicle, said frame having main longitudinal members arranged to roll on rollers provided at or near the rear of the vehicle chassis and an upright member upstanding from the forward ends of said longitudinal members, said upright member having near the top thereof a bar designed to engage a hook forming part of hydraulic lifting mechanism on said vehicle, wherein said frame is also provided with anchor members designed to cooperate with locking means on the vehicle chassis to positively restrict movement of the frame relative to the vehicle chassis, and wherein coupling means are mounted on said frame adjacent to the rear end thereof for coupling a trailer to said vehicle.

* * * * *